E. H Graham-
Picker-Staff Motion for Looms-
Reissued May 28. 1867-
No 2,626-
Fig. 3
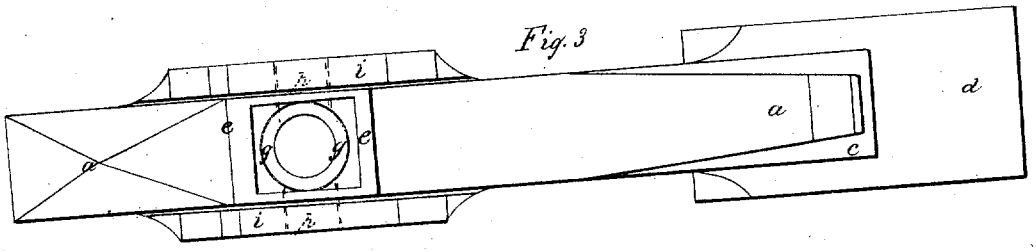
Fig. 1
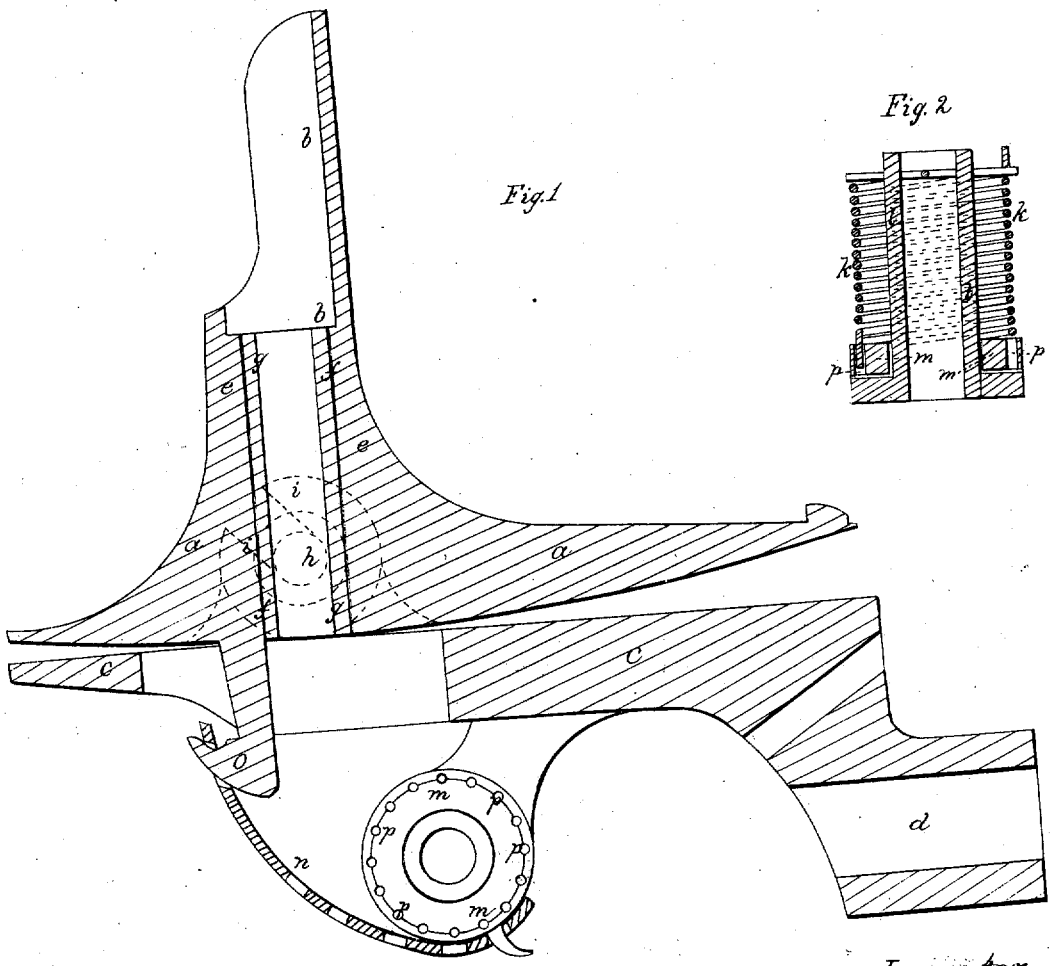
Fig. 2
Witnesses
A. W. Brown
Frederic A Sayer
Inventor
Edmund H Graham
by his atty
Esm Lincoln

United States Patent Office.

EDMUND H. GRAHAM, OF MANCHESTER, NEW HAMPSHIRE, AND WANTON ROUSE, OF TAUNTON, MASSACHUSETTS, ASSIGNEES OF EDMUND H. GRAHAM.

*Letters Patent No.* 30,441, *dated October* 16, 1860; *reissue No.* 2,367, *dated October* 2, 1866; *reissue No.* 2,626, *dated May* 28, 1867.

IMPROVEMENT IN PICKER-STAFF MOTION FOR LOOMS.

The Schedule referred to in these Letters Patent and making part of the same.

TO ALL WHOM IT MAY CONCERN:

Be it known that EDMUND H. GRAHAM, of Manchester, county of Hillsborough, and State of New Hampshire, did invent certain new and useful Improvements in Picker-Staff Motions for Looms; and I, the said GRAHAM, and I, WANTON ROUSE, of Taunton, county of Bristol, and State of Massachusetts, (assignee of an undivided half part thereof, by assignment duly recorded in the United States Patent Office,) do hereby declare that the following is a full, clear, and exact description thereof, reference being had to the annexed drawings, making part of this specification, in which—

Figure 1 represents a vertical central longitudinal section through so much of a picker-staff and its appurtenances, embracing said improvements, as is necessary to illustrate the invention.

Figure 2 represents a central longitudinal horizontal section through the retracting spring of the picker-staff and its cylinder.

Figure 3 is a plan or top view of fig. 1.

In the devices commonly employed previous to the invention herein claimed for vibrating the picker-staffs of looms, the rapid motion necessarily communicated to the picker-staffs, in order to drive the shuttles with the requisite rapidity, soon causes a derangement and consequent "wabbling" of the parts, and necessitates frequent repairs, as it is essential that the motions of the picker-staff should be accurate.

The object of the improvement herein claimed is to produce an accurate and sure motion for picker-staffs by a combination of devices which, while giving great accuracy of motion, so guides and holds the picker-staff as to cause it to operate with the least possible friction and lateral disarrangement or wabbling.

In the accompanying drawings, *a a* represent a curved rocker, in the socket *b b* of which the picker-staff is to be fastened. The rocker *a a* plays upon a horizontal bed *c c*, having a socket, *d*, through which the shaft of the loom passes in the usual way. The shank *e e* of the rocker *a a* is made hollow, or with a suitable box or bearing, *f f*, into which a shaft-arm or bar, *g g*, is inserted, which arm, by means of journals projecting each side thereof, has a bearing in the eyes *i i*, formed in the bed-piece *c c*. By this arrangement the rocker (in its reciprocating movement) is kept perfectly true in its bearings by the arm or bar *g g* which holds the rocker *a a* truly in position, in consequence of its long bearing therein; and as the arm or bar *g g* also oscillates freely upon its journals *h h*, which further serve to steady the rocker laterally, the rocker moves with the least possible friction, and with the greatest accuracy, so that the wear and tear is necessarily but very slight. The eyes or bearings *i* have inclined slots (shown in dotted lines in fig. 1) cut in them so as to form ears or open boxes, in which the journals *h h* are inserted when the parts of the picker-motion are put together. By this means the shaft or arm *g*, and its journals *h*, can readily be removed and replaced, and are free to play without liability to work out of their bearings. The rocker *a a* is retracted by means of a spiral spring, *k k*, wound loosely around a short shaft, *l*, and attached at one end to a plate, *m*, which turns freely on the shaft *l*. A strap, *n*, attached to the plate *m*, fits over a hook, *o*, on the under side of the rocker *a a*. As the spring *k k* is liable to partially lose its force by the motions of the rocker *a a*, I have provided for this contingency by forming in the plate *m* a series of holes, *p p*, into which successively one end of the spring *k k* is set, as fast as it loses its elastic force, whereby the spring can be set up at pleasure, and its force graduated, without the necessity of frequent repairing or renewals.

The first part of this invention relates to the position of the journals. This position is determined by the position of the socket for the picker-staff, which socket is so placed that the point of the picker-staff which strikes the shuttle must move in the required line; and this part of the invention consists in placing the journal at or near this socket, and as near the level of the bed as practicable. In this position there is the least possible wear, and the journals perform all their functions to the best possible advantage. It is obvious that as every point upon the rocker varies its position in the action of the motion, with reference to the bed, it is impossible to connect the journal directly with the rocker, and its box directly with the bed, or *vice versa*; one or the other must be indirectly connected; and it is for this reason that in the motion described the journals are placed upon the arm *g*, upon which the rocker can play up and down. So far as we know, no rocker has ever been combined with its bed by means of journals before this invention.

The second part of this invention consists in forming the boxes, or bearings for the journals, with such an opening that the journals may be laid in them in putting the motion together, without liability to work out in the operation of the rocker, as plainly shown in the drawings. This method of construction is much cheaper than making the boxes cylindrical, and is quite as efficient in every respect.

What is claimed as the invention of the said GRAHAM, is—

1. The combination of a rocker of a picker-staff with its bed by loose journals, projecting each side of the picker-staff, and arranged beneath the picker-staff, substantially as described.

2. In combination with the rocker, the bed, and the journals, the open boxes, substantially as and for the purpose described.

3. In combination with the rocker and its bed, the journal-bearing arm, operating substantially as and for the purpose specified.

Witnesses:
A. F. JEWETT,
J. E. MAYNADIER,

EDMUND H. GRAHAM.
WANTON ROUSE.